(12) United States Patent  
Leblanc

(10) Patent No.: US 10,509,143 B2  
(45) Date of Patent: *Dec. 17, 2019

(54) METHOD AND SYSTEM FOR COMBINING LOCALIZED WEATHER FORECASTING AND ITINERARY PLANNING

(71) Applicant: SkyMotion Research, ULC, Montreal (CA)

(72) Inventor: Andre Leblanc, Mont-Royal (CA)

(73) Assignee: SKY MOTION RESEARCH, ULC, Quebec (CA)

(*) Notice: Subject to any disclaimer, the term of this patent is extended or adjusted under 35 U.S.C. 154(b) by 158 days.

This patent is subject to a terminal disclaimer.

(21) Appl. No.: 15/817,376

(22) Filed: Nov. 20, 2017

(65) Prior Publication Data

US 2018/0074225 A1 Mar. 15, 2018

Related U.S. Application Data

(63) Continuation of application No. 14/244,586, filed on Apr. 3, 2014, now Pat. No. 10,324,231.

(60) Provisional application No. 61/836,713, filed on Jun. 19, 2013.

(51) Int. Cl.
| | |
|---|---|
| *G01W 1/10* | (2006.01) |
| *G01C 21/34* | (2006.01) |
| *G01C 21/36* | (2006.01) |

(52) U.S. Cl.
CPC .......... *G01W 1/10* (2013.01); *G01C 21/3461* (2013.01); *G01C 21/3691* (2013.01)

(58) Field of Classification Search
None
See application file for complete search history.

(56) References Cited

U.S. PATENT DOCUMENTS

| | | |
|---|---|---|
| 5,406,481 A | 4/1995 | Shinozawa et al. |
| 5,574,647 A | 11/1996 | Liden |
| 5,974,360 A | 10/1999 | Otsuka et al. |

(Continued)

FOREIGN PATENT DOCUMENTS

| | | |
|---|---|---|
| CA | 2514868 A1 | 8/2014 |
| CN | 1481512 A | 3/2004 |

(Continued)

OTHER PUBLICATIONS

Appeal; US Court of Appeals for the Federal Circuit; *Electric Power Group, LLC v. Alstom S.A.*, Aug. 1, 2016; 12 pages.

(Continued)

*Primary Examiner* — Roy Y Yi
(74) *Attorney, Agent, or Firm* — Pillsbury Winthrop Shaw Pittman LLP

(57) ABSTRACT

Provided are methods, devices, and non-transitory computer-readable storage mediums to generate an itinerary with a weather forecast. The itinerary may comprise a departure location, a destination location and a first time. Based on the itinerary, an intermediary location and an intermediary time associated with the intermediary location may be identified. A weather forecast associated with the identified intermediary location and the intermediary time may be predicted. A weather risk associated with the identified route may be assessed and based on the assessed risk, an alternative route may be additionally identified.

20 Claims, 8 Drawing Sheets

(56) References Cited

U.S. PATENT DOCUMENTS

| | | | |
|---|---|---|---|
| 6,128,578 | A | 10/2000 | Sakaino et al. |
| 6,201,494 | B1 | 3/2001 | Kronfeld |
| 6,298,307 | B1 | 10/2001 | Murphy et al. |
| 6,317,686 | B1 | 11/2001 | Ran |
| 6,360,172 | B1 | 3/2002 | Burfeind et al. |
| 6,496,780 | B1 | 12/2002 | Harris et al. |
| 6,501,392 | B2 | 12/2002 | Gremmert et al. |
| 6,535,817 | B1 | 3/2003 | Krishnamurti |
| 6,542,825 | B2 | 4/2003 | Jones |
| 6,581,009 | B1 | 6/2003 | Smith |
| 6,590,529 | B2 | 7/2003 | Schwoegler |
| 6,850,184 | B1 | 2/2005 | Desrochers et al. |
| 6,920,233 | B2 | 7/2005 | Wolfson et al. |
| 6,961,061 | B1 | 11/2005 | Johnson |
| 6,980,908 | B2 | 12/2005 | McKewon et al. |
| 6,985,837 | B2 | 1/2006 | Moon et al. |
| 7,043,368 | B1 | 5/2006 | Cote |
| 7,062,066 | B2 | 6/2006 | Wolfson et al. |
| 7,069,258 | B1 | 6/2006 | Bothwell |
| 7,082,382 | B1 | 7/2006 | Rose |
| 7,181,345 | B2 | 2/2007 | Rosenfeld et al. |
| 7,231,300 | B1 | 6/2007 | Rose, Jr. |
| 7,231,309 | B2 | 6/2007 | Yeh et al. |
| 7,321,827 | B1 | 1/2008 | Myers |
| 7,379,817 | B1 | 5/2008 | Tyson et al. |
| 7,391,358 | B2 | 6/2008 | Dupree et al. |
| 7,421,344 | B1 | 9/2008 | Marsh et al. |
| 7,472,021 | B2 | 12/2008 | Bieringer et al. |
| 7,486,220 | B1 | 2/2009 | Kronfeld et al. |
| 7,515,088 | B1 | 4/2009 | Woodell |
| 7,542,852 | B1 | 6/2009 | Rose et al. |
| 7,558,674 | B1 | 7/2009 | Neilley |
| 8,280,633 | B1 | 10/2012 | Eldering et al. |
| 8,332,084 | B1 | 12/2012 | Bailey et al. |
| 2001/0030624 | A1 | 10/2001 | Schwoegler |
| 2001/0049584 | A1 | 12/2001 | Jones et al. |
| 2002/0038353 | A1 | 3/2002 | Yamamoto |
| 2002/0114517 | A1 | 8/2002 | Wolfson et al. |
| 2003/0035860 | A1 | 2/2003 | Ando et al. |
| 2003/0193411 | A1 | 10/2003 | Price |
| 2004/0010372 | A1 | 1/2004 | Schwoegler |
| 2004/0043760 | A1 | 3/2004 | Rosenfeld et al. |
| 2004/0143396 | A1 | 7/2004 | Allen et al. |
| 2004/0215483 | A1 | 10/2004 | Fixman |
| 2005/0197774 | A1 | 9/2005 | Egi |
| 2005/0222770 | A1 | 10/2005 | McKewon et al. |
| 2006/0015254 | A1 | 1/2006 | Smith |
| 2006/0271297 | A1 | 11/2006 | Repelli et al. |
| 2006/0287818 | A1 | 12/2006 | Okude et al. |
| 2007/0069941 | A1 | 3/2007 | Pearlman et al. |
| 2007/0112476 | A1 | 5/2007 | Obradovich |
| 2007/0256716 | A1 | 11/2007 | Resner |
| 2008/0097701 | A1 | 4/2008 | Zawadzki et al. |
| 2008/0201647 | A1 | 8/2008 | Lagerstedt et al. |
| 2008/0313037 | A1 | 12/2008 | Root et al. |
| 2009/0037100 | A1 | 2/2009 | Fujiwara |
| 2009/0088965 | A1 | 4/2009 | Burckart et al. |
| 2009/0157294 | A1 | 6/2009 | Geelen |
| 2009/0157298 | A1 | 6/2009 | Kon |
| 2009/0210353 | A1 | 8/2009 | Mitchell et al. |
| 2010/0250581 | A1 | 9/2010 | Chau |
| 2011/0054776 | A1 | 3/2011 | Petrov et al. |
| 2011/0267224 | A1 | 11/2011 | Venkatachalam et al. |
| 2011/0307168 | A1 | 12/2011 | Kieff |
| 2012/0147030 | A1 | 6/2012 | Hankers et al. |
| 2012/0170030 | A1 | 7/2012 | Mihajlovic et al. |
| 2013/0013206 | A1 | 1/2013 | Guha et al. |
| 2013/0035860 | A1 | 2/2013 | Guha et al. |
| 2013/0046459 | A1 | 2/2013 | Itakura |
| 2014/0067270 | A1 | 3/2014 | Gail |
| 2014/0303893 | A1 | 10/2014 | LeBlanc |
| 2014/0368361 | A1 | 12/2014 | Leblanc |
| 2014/0372038 | A1 | 12/2014 | LeBlanc |
| 2014/0372039 | A1 | 12/2014 | LeBlanc |
| 2014/0379264 | A1 | 12/2014 | LeBlanc |
| 2015/0006079 | A1* | 1/2015 | Leblanc ............ G01W 1/10 702/3 |

FOREIGN PATENT DOCUMENTS

| | | |
|---|---|---|
| CN | 101349767 A | 1/2009 |
| CN | 102169194 A | 8/2011 |
| CN | 102809767 A | 12/2012 |
| EP | 1218698 | 7/2002 |
| EP | 1566665 A1 | 8/2005 |
| EP | 2415044 A1 | 2/2012 |
| JP | H05-307080 | 11/1993 |
| JP | H08-261854 A | 10/1996 |
| JP | 2009096679 | 4/1997 |
| JP | H09-096679 A | 4/1997 |
| JP | H11-2539 A | 1/1999 |
| JP | 11-136365 A | 5/1999 |
| JP | H11-014760 (A) | 5/1999 |
| JP | H11-242080 A | 9/1999 |
| JP | 2000193469 A | 7/2000 |
| JP | 2000258174 A | 9/2000 |
| JP | 2001-081711 A | 3/2001 |
| JP | 200258174 A | 2/2002 |
| JP | 2002099576 A | 4/2002 |
| JP | 2002148061 A | 5/2002 |
| JP | 2002357670 A | 12/2002 |
| JP | 2003030421 A | 1/2003 |
| JP | 2003121172 A | 4/2003 |
| JP | 2003216752 A | 7/2003 |
| JP | 2004-028625 A | 1/2004 |
| JP | 2004069478 A | 3/2004 |
| JP | 2004170201 A | 6/2004 |
| JP | 2004516462 A | 6/2004 |
| JP | 2004184224 A | 7/2004 |
| JP | 2005-300176 | 10/2005 |
| JP | 2005-316888 A | 11/2005 |
| JP | 2006197106 A | 7/2006 |
| JP | 2006337182 A | 12/2006 |
| JP | 2003300176 A | 2/2007 |
| JP | 2007047034 A | 2/2007 |
| JP | 2007-163442 A | 6/2007 |
| JP | 2008008776 A | 1/2008 |
| JP | 2008157919 A | 7/2008 |
| JP | 2008203173 A | 9/2008 |
| JP | 2009-025083 A | 2/2009 |
| JP | 2009-108456 A | 5/2009 |
| JP | 2009230720 A2 | 10/2009 |
| JP | 2010060444 A | 3/2010 |
| JP | 2010521020 A | 6/2010 |
| JP | 2010-164557 A | 7/2010 |
| JP | 2011257149 A | 12/2011 |
| JP | 2012052930 A | 3/2012 |
| JP | 2012126384 A | 7/2012 |
| JP | 05307080 (B2) | 10/2013 |
| JP | 20050307080 B2 | 10/2013 |
| TW | 200506410 | 2/2005 |
| TW | 201209441 A | 3/2012 |
| TW | 201224502 A | 6/2012 |
| TW | 201231920 A | 8/2012 |
| WO | WO-01/25727 A1 | 4/2001 |
| WO | WO-2002023462 | 3/2002 |
| WO | WO-2002049310 A2 | 6/2002 |
| WO | WO-2012062760 A1 | 5/2012 |
| WO | WO-2012089280 A1 | 7/2012 |
| WO | WO-20140161077 A1 | 10/2014 |
| WO | WO-20140161079 | 10/2014 |

OTHER PUBLICATIONS

EP Search Report from Appln. 14778718.8, dated Nov. 25, 2016.
EP Search Report from Appln. 14778742.8, dated Dec. 23, 2016.
EP Search Report from Appln. 14779094.3, dated Aug. 12, 2016.
EP Search Report from Appln. 14779873.0, dated Nov. 25, 2016.
International Search Report and Written Opinion dated Jul. 11, 2014, directed to International Application No. PCT/CA2014/000317, 12 pages.

(56) References Cited

OTHER PUBLICATIONS

International Search Report and Written Opinion dated Jul. 15, 2014, directed to International Application No. PCT/CA2014/000314, 8 pages.
International Search Report and Written Opinion dated Jul. 17, 2014, directed to International Application No. PCT/CA2014/00315, 8 pages.
International Search Report and Written Opinion dated Jul. 21, 2014, directed to International Application No. PCT/CA2014/000333, 10 pages.
International Search Report and Written Opinion dated Jul. 23, 2014, directed to International Application No. PCT/CA2014/000313, 9 pages.
International Search Report and Written Opinion dated Jul. 24, 2014, directed to International Application No. PCT/CA2014/000330, 10 pages.

Mass, Clifford F., "Forecaster's Forum—IFPS and the Future of the National Weather Service," *American Meteorological Society*, Feb. 2003, Nov. 11, 2002 and Dec. 2, 2002., p. 76.
Press Release (Oct. 26, 2012) "New AccuWeather App for Windows 8 Takes Users on a Journey," located at <http://www.accuweather.com/en/press/699373>, (3 pages).
Probability of Precipitation, Feb. 23, 2012, URL<http://web.archive.org/web/20120223192309/https:/ja.wikipedia.org/wiki%E9%99%8dE6%B0%B4%E7%A2%BAE7%8E%87>.
Qhtani, Abdulrahman, "Weather Spark" viewed on the internet on Mar. 31, 2017, https://www.youtube.com/watch?v=6LZjaweaXyc> Uploaded/Published Feb. 25, 2012.
Shen J., "Significance, Current Situation and Method of Weather Probability Forecast," Hubei Weather, No. 2, 1996.
Wikipedia.org, "Weather forecasting", version published Mar. 12, 2013, retrieved from internet on Mar. 27, 2017 https://web.archive.org.web/20130312014022/http:en.wikipedia.org/wiki/Weather_forecasting>.

\* cited by examiner

METHOD AND SYSTEM FOR COMBINING LOCALIZED WEATHER FORECASTING AND ITINERARY PLANNING

CROSS-REFERENCE TO RELATED APPLICATIONS

This application claims priority to U.S. patent application Ser. No. 14/244,586, filed on Apr. 3, 2014, which claims priority to U.S. Provisional Application No. 61/836,713, filed on Jun. 19, 2013, and is related to co-owned and co-invented U.S. patent application Ser. No. 13/856,923, filed on Apr. 4, 2013, U.S. patent application Ser. No. 13/922,800, filed on Jun. 20, 2013, U.S. patent application Ser. No. 13/947,331, filed on Jul. 22, 2013, U.S. patent application Ser. No. 14/244,516, filed on Apr. 3, 2014, and U.S. patent application Ser. No. 14/244,383, filed on Apr. 3, 2014, the entire contents of which are hereby incorporated by reference.

FIELD OF THE INVENTION

The subject matter disclosed generally relates to methods for producing weather forecasts. More specifically, the subject matter relates to software applications for producing weather forecasts.

BACKGROUND OF THE INVENTION

Conventional weather forecasting systems provide weather predictions 12 hours to a few days from the present time. If one needs a short-term forecast or a forecast with a fine time scale, the best information available usually is an hourly forecast for the day.

Conventional weather forecasts are average forecasts for the area for which they are generated. Thus, a forecast may be inaccurate for a precise location within this area, and even the present weather displayed for an area may differ from the actual weather for a precise location within this area.

Moreover, conventional weather forecasts are displayed at a time scale that is too coarse to allow a user to know when a weather event takes place in a precise location and time. Even for hourly conventional weather forecasts, it is impossible for the user to know if the forecasted weather event will last one hour or one minute and, for the latter, at what time it will take place exactly within the hour.

For a user who stays at the same place during a part of a day, conventional weather forecasts may provide a reliable weather forecast. However, for a moving user, conventional weather forecasts that are communicated to the public lack the necessary temporal and spatial resolution to provide the moving user with a reliable weather forecast along the itinerary of the user. Furthermore, no conventional weather forecasts or itinerary planning tools estimate the delays caused by weather on a route, although there is a need for tools comprising that function.

Therefore, there is a need in the market for the generation and display of short-term weather forecasts for various locations and times, and there is further a need in the market for a system and method which allow for estimating the weather along the route between the departure location and the destination location so that the user may attempt to take alternative routes to avoid extreme weather conditions.

SUMMARY

There may be provided a computer implemented method for generating itineraries comprising: identifying a departure location, a destination location and a first time, identifying an intermediary location between the departure location and the destination location, identifying an intermediary time associated with the intermediary location, identifying a weather forecast associated with the intermediary location and the intermediary time, and identifying an itinerary based at least on the weather forecast.

In some embodiments, the method may comprise estimating a travel time between locations based on the weather forecast.

In some embodiments, the method may comprise identifying at least one of a modified intermediary time based on the weather forecast, and identifying a modified weather forecast associated with the intermediary location and the modified intermediary time.

In some embodiments, the method may comprise identifying a weather severity level associated with the weather forecast of the intermediary location and the intermediary time. The itinerary may be identified based on the weather severity level.

In some embodiments, the method may comprise: identifying an alternative intermediary location based on the weather severity level, identifying a second intermediary time associated with the alternative location, and identifying a second weather forecast associated with the alternative intermediary location and the second intermediary time, wherein the itinerary is identified based at least on the second weather forecast.

In some embodiments, the weather forecast may comprise information indicating a probability of a specific type of precipitation at a specific rate.

In some embodiments, the departure location, the destination location and the first time may be received from a remote device (e.g. GPS, a user-operable device, etc.). At least one of the departure location and the destination location may be associated with a current location of the remote device, and the first time may be associated with a current time.

In some embodiments, the method may comprise: identifying multiple intermediary locations, identifying multiple intermediary times associated with the multiple intermediary locations, and identifying multiple weather forecasts associated with the multiple intermediary locations and the multiple intermediary times, wherein the itinerary is identified based at least on the multiple weather forecasts.

In some embodiments, the method may comprise: identifying a first set of intermediary locations and a second set of intermediary locations, identifying a third set of intermediary times associated with the first set of intermediary locations, identifying a fourth set of intermediary times associated with the second set of intermediary locations, identifying a fifth set of weather forecasts associated with the first set of intermediary locations and the third set of intermediary times, identifying a sixth set of weather forecasts associated with the second set of intermediary locations and the fourth set of intermediary times, and comparing a weather severity level associated with the fifth set of weather forecasts with a weather severity level associated with the sixth set of weather forecasts, wherein, based on the comparison, the identified itinerary comprises the first set of intermediary locations or the second set of intermediary locations.

In other embodiments, there may be provided a computer implemented method for generating itineraries comprising: receiving an itinerary request including a departure location, a destination location and a given time, in response to receiving the itinerary request, obtaining a list of locations and a list of times corresponding to the locations, obtaining a weather forecast for each location of the list of locations for the time corresponding to each location, resulting in a list of weather forecasts, and outputting the list of weather forecasts for corresponding locations. The method may comprise estimating a delay in a displacement due to the weather forecasts. The delay in the displacement may be used to modify the times corresponding to the locations.

In some embodiments, there may be a device comprising one or more processors, a memory storing computer instructions that can be executed by the one or more processors such that the device is caused to perform any one or more of the methods described above, when the instructions are executed. Further, there may be a non-transitory computer-readable medium storing such instructions.

Further, there may be a device that comprises one or more processors, a memory storing instructions for the one or more processors, a communication module to connect to a remote server over a communication network, and a display. When the instructions are executed, the device may be caused to: receive, from the remote server, an itinerary comprising a departure location, a destination location and an intermediary location, the itinerary generated based at least on a weather forecast associated with the intermediary location and an intermediary time, the intermediary time representing the time at which the device is expected to arrive at the intermediary location, and cause, on the display, a display of at least a part of the itinerary received from the remote server. The device may be a mobile device such as, non-exclusively, a handheld device, a cellphone, a vehicle, etc.

BRIEF DESCRIPTION OF THE DRAWINGS

Further features and advantages of the present disclosure will become apparent from the following detailed description, taken in combination with the appended drawings, in which.

It will be noted that, throughout the appended drawings, like features are identified by like reference numerals.

DETAILED DESCRIPTION OF THE INVENTION

Figure 1:
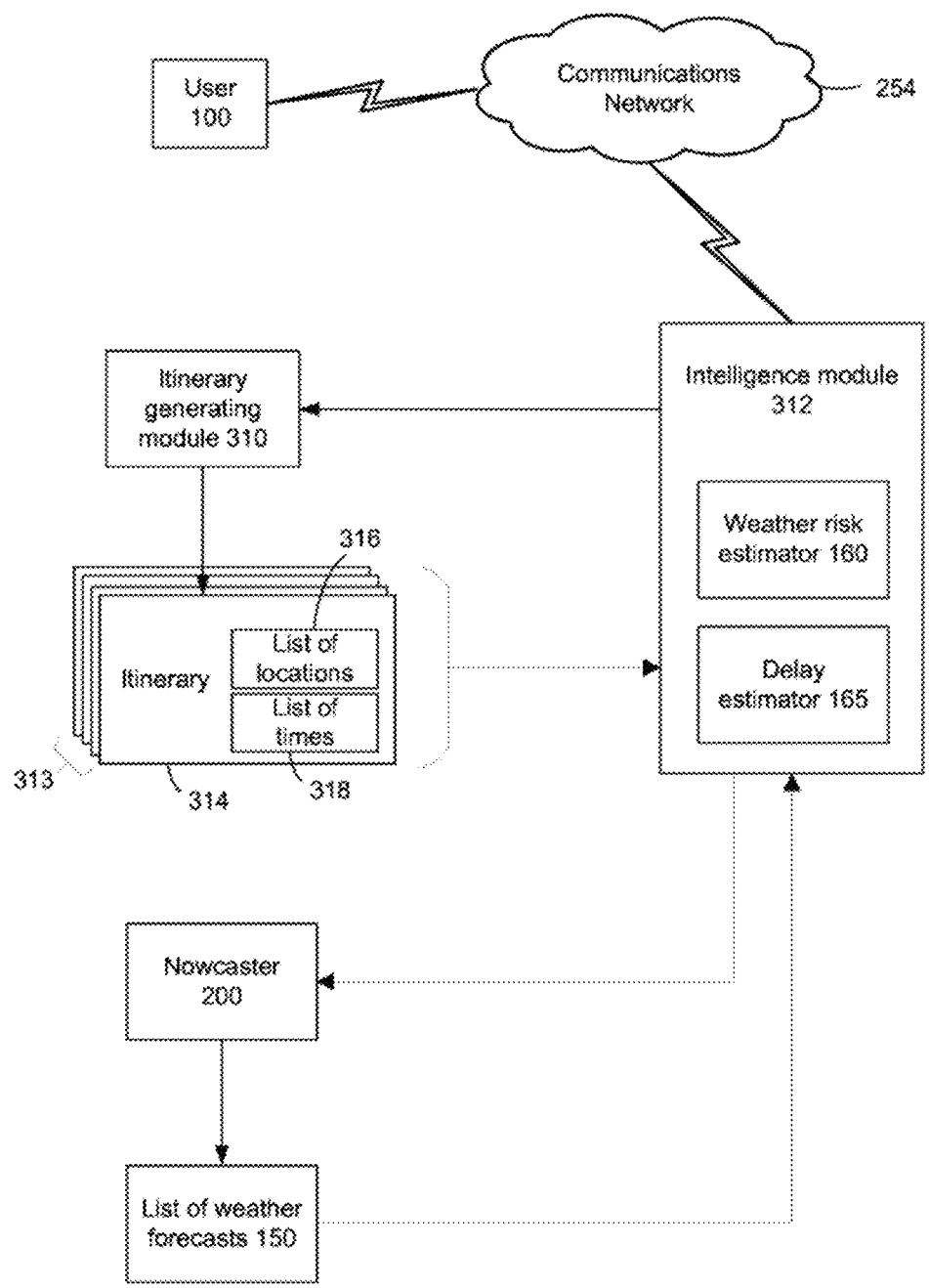
FIG. 1 shows an example of a block diagram of a system for combining localized weather forecasting and itinerary planning.

The embodiments will now be described more fully hereinafter with reference to the accompanying drawings, which form a part hereof, and which show, by way of illustration, specific embodiments by which the embodiments may be practiced. The embodiments are also described so that the disclosure conveys the scope of the claimed subject matter to those skilled in the art. The embodiments may, however, be embodied in many different forms and should not be construed as limited to the embodiments set forth herein.

Among other things, the present embodiments may be embodied as methods or devices. Accordingly, the embodiments may take the form of an entirely hardware embodiment, an entirely software embodiment, an embodiment combining software and hardware aspects, etc. Furthermore, although the embodiments are described with reference to a portable or handheld device, they may also be implemented on desktops, laptop computers, tablet devices, or any computing device having sufficient computing resources to implement the embodiments.

Definitions

In the present specification, the following terms are meant to be defined as indicated below:

Nowcasting: The term nowcasting is a contraction of "now" and "forecasting"; it refers to the sets of techniques devised to make short-term forecasts, typically in the 0- to 12-hour range.

A nowcaster is a weather forecasting device which prepares very short-term (e.g., 1 minute, 5 minutes, 15 minutes, 30 minutes, etc.) forecasts for a very small region on Earth (5 meters, 10 meters, 50 meters, 100 meters, 500 meters, 1,000 meters, etc.).

A weather value is a weather-related quantity or attribute of any sort such as temperature, pressure, visibility, precipitation type and intensity, accumulation, cloud cover, wind, etc.

A forecasted weather value is a weather value that is predicted by the nowcaster.

A weather-related event is an event that can affect a weather value or a forecasted weather value, which include, for example, at least one of hail, a wind gust, lightning, a temperature change, etc.

Precipitation type (PType): indicates the type of precipitation. Examples of precipitation types include, but are not limited to, rain, snow, hail, freezing rain, ice pellets, or ice crystals.

Precipitation rate (PRate): indicates the precipitation intensity. Examples of precipitation rate values include, but are not limited to, no (i.e., none), light, moderate, heavy, extreme. In an embodiment, the precipitation rate can also be expressed as a range of values such as: none to light, light to moderate, moderate to heavy, or any combination of the above.

Precipitation probability: indicates the probability that precipitation might occur. Examples of precipitation probability values include, but are not limited to, no, unlikely, slight chance of, chance of, likely, very likely, or certain.

In an embodiment, the precipitation probability can also be expressed as a range of values such as: none to light, light to moderate, or moderate to heavy. Precipitation probability may also be expressed in terms of percentages; e.g., 0%, 25%, 50%, 75%, 100%; or ranges of percentages; e.g., 0% to 25%, 25% to 50%, 50% to 75%, 75% to 100%. In an embodiment, the precipitation probability may be taken from a probability distribution.

Precipitation type and precipitation rate categories (PTypeRate): a PTypeRate category is combination of precipitation type and precipitation rate to which may be associated a probability of occurrence for a given period to indicate the possibility of receiving a certain type of precipitation at a certain rate.

A weather forecast is a set of one or more forecasted weather values that are displayable to users.

A user is a person to whom or machine to which a weather forecast is forwarded.

An itinerary is a list of locations or directions guiding a user from point A to point B. Optionally, the itinerary may comprise times corresponding to a location or time intervals between locations. A key point is a location that meets a criterion which may be a user's preference.

Briefly stated, the present embodiments describe a method and system for combining localized weather forecasting and itinerary planning. The weather forecast is generated by a short-term weather forecaster known as a system for generating nowcasts or a nowcaster.

Now referring to FIG. 1, there is described a system for combining localized weather forecasting and itinerary planning. The system comprises an intelligence module 312, an itinerary generating module 310 and a nowcaster 200. The intelligence module 312 further comprises a weather risk estimator 160 and a delay estimator 165. These components will be further described below.

Itinerary Generation Module

The itinerary generating module 310 may be a web-based module and/or a GPS-based module for generating routes and directions.

Figure 3:
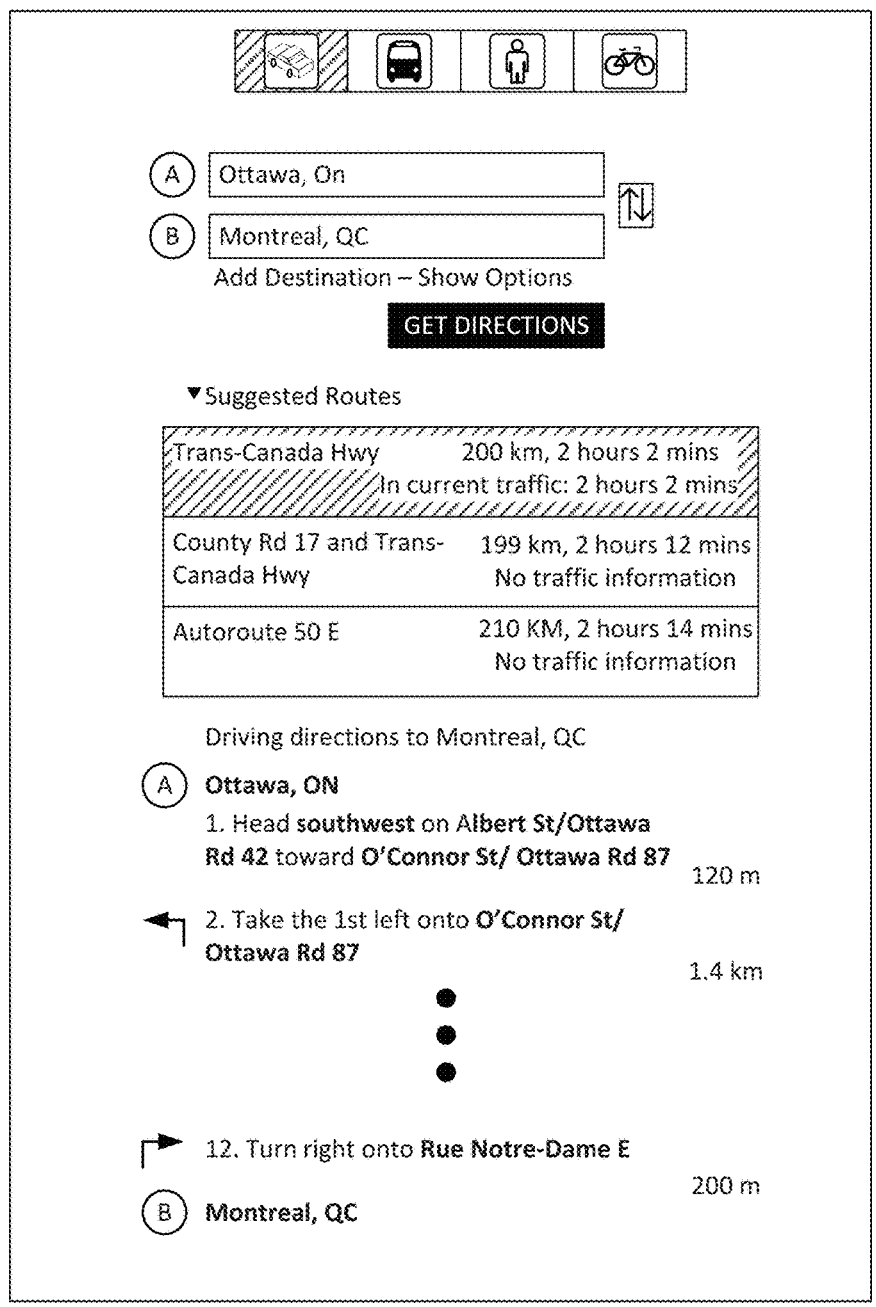
FIG. 3 is a screenshot illustrating an example of an itinerary returned by an itinerary generating module.

An example of such web-based modules may include MapQuest™, Yahoo™ Maps, Google™ Maps, and so on. In these types of modules, the data relating to the generation or routes is stored on a remote server that is accessible via a telecommunications network such as the Internet. Using these modules, the user may request directions from a first location A to a second location B, whereby the module may return a list of directions for the displacement from A to B as shown in FIG. 3.

As shown in FIG. 1, the itinerary generating module 310 generates an itinerary 314, which comprises a list of locations 316 and a list of times 318, where the times correspond to the locations.

In an embodiment, the itinerary generating module 310 may provide one or more choices of itineraries for the user to choose. Then, the module generates a list 313 of itineraries.

In another embodiment, the data may be downloaded and/or pushed from the server to the computing device on which the embodiments are practiced, whereby the route may be displayed without accessing the remote server.

In an embodiment, the itinerary generating module 310 may also include a GPS device which determines the current location of the user using a satellite connection. The GPS unit may be embedded in a portable device such as an iPhone™ or the like. In another example, the GPS device may be embedded in a handheld GPS navigation device such as the series of devices manufactured by Garmin™ or Magellan™ etc.

Intelligence Module

As shown in FIG. 1, the intelligence module 312 links the user 100, the itinerary generating module 310, and the nowcaster 200 by sending appropriate queries to and receiving information from these elements. More precisely, the intelligence module 312 may receive information from a user 100 through a communication network 254. In an embodiment, the intelligence module 312 may be linked to a user interface for receiving the user's entries such that the identification of the locations A and B, departure time, and the user preferences regarding the locations for which the nowcasts are needed. The intelligence module 312 may use this information received from user 100 to query the itinerary generating module 310, for example, by sending the geographic locations of points A and B characterizing the beginning and the end of the itinerary. The intelligence module 312 may also send to the itinerary generating module 310 information about the beginning time of the itinerary or about the user's preferences. For example, the user may choose to obtain the nowcasts for key points such as major cities along the route, or by increments of, for example, 30 km, etc.

According to an embodiment, the intelligence module 312 sends a first time or a current time and a time interval to the itinerary generating module 310.

Depending on the embodiment, the intelligence module 312 or the itinerary generating module 310 may estimate a time of arrival for each key point which represents the estimated time at which the user is expected to arrive at a certain key point. Estimation of the arrival time may depend on several factors including: the departure time (which, unless specified by the user, is taken as the present time), the distance between the departure point and the respective key point, traffic information received from the itinerary generating module 310 (or another source), weather information, current speed, and speed limit associated with each segment of the route between the current location and the respective key point.

The itinerary generating module 310 generates an itinerary 314 or a list 313 of itineraries as described hereinabove. According to an embodiment, each itinerary comprises a list of locations 316 and a list of times 318. This information is sent back to the intelligence module 312.

According to an embodiment, the intelligence module may select locations (such as the key points specified in the user's preferences) and their corresponding times and sends them to the nowcaster 200.

In an embodiment, the intelligence module 312 may send the location information of each location or key point along with the current time whereby the user may see the current weather conditions in the different locations along the route.

Depending on the embodiment, the intelligence module 312 may send all the list in just one call to the server on which the nowcaster 200 is implemented, or, on the contrary, divide the list into more than one part when the call is sent to the nowcaster 200.

For each location and time, the nowcaster 200 outputs a weather forecast. Therefore, the nowcaster 200 generates a list of weather forecasts 150 corresponding to each itinerary 314.

As discussed above, the itinerary generating module 310 may provide different choices of routes comprising weather conditions along different locations or key points. In an embodiment, when more than one itinerary is provided, a weather risk estimator 160 within the intelligence module 312 may compute the risk associated with each list of weather forecasts 150 corresponding to an itinerary, thus sorting the lists of weather forecasts 150 and their corresponding itinerary according to the weather risk. The weather risk estimator 160 may assign each itinerary a category or a grade depending on the gravity of the weather events happening on the itinerary (strong winds, heavy rain, etc.) or the probability that these events will take place. Sorting itineraries adds information (the estimated risk) to the lists of weather forecasts 150. According to an embodiment, if the itinerary is displayed (textually or graphically), the parts of the itineraries that have a higher or lower risk may be displayed with a distinctive color.

According to an embodiment, if the weather risk is estimated for various itineraries, the method may route traffic to the least risky itinerary.

When the intelligence module has received locations, times, weather forecasts, and other information (such as weather risk) of an itinerary, this information is sent to the user 100 using the communication network 254.

According to an embodiment, the weather forecast for each location and time in an itinerary may be provided on a single web page.

According to an embodiment, the intelligence module 312 may comprise a delay estimator 165. The delay estimator 165 uses the list of weather forecasts to determine the delay on a part of an itinerary due to the weather conditions, such as rain, fog, strong wind, etc., that can slow down the traffic. The delay estimator 165 may use a database comprising statistics about the delays due to weather conditions. If the delay estimator 165 is used, the list of times 318 corresponding to the list of locations 316 is not relevant anymore because delays change the times in the itinerary. Therefore, the intelligence module queries again the itinerary generating module 310 by taking into account the delays, producing a more accurate list of times 318. The intelligence module 312 receives this updated list of times 318 and sends it to the nowcaster 200 for an update of the list of weather forecasts 150. Therefore, when the delay estimator is used, an iterative process takes place. This iterative process may be programmed to cease after a given number of iterations or after equilibrium is reached in the results. When the iterative process is done, the intelligence module outputs the list 313 of itineraries along with the most accurate list of weather forecasts 150.

Nowcaster

Figure 2A:
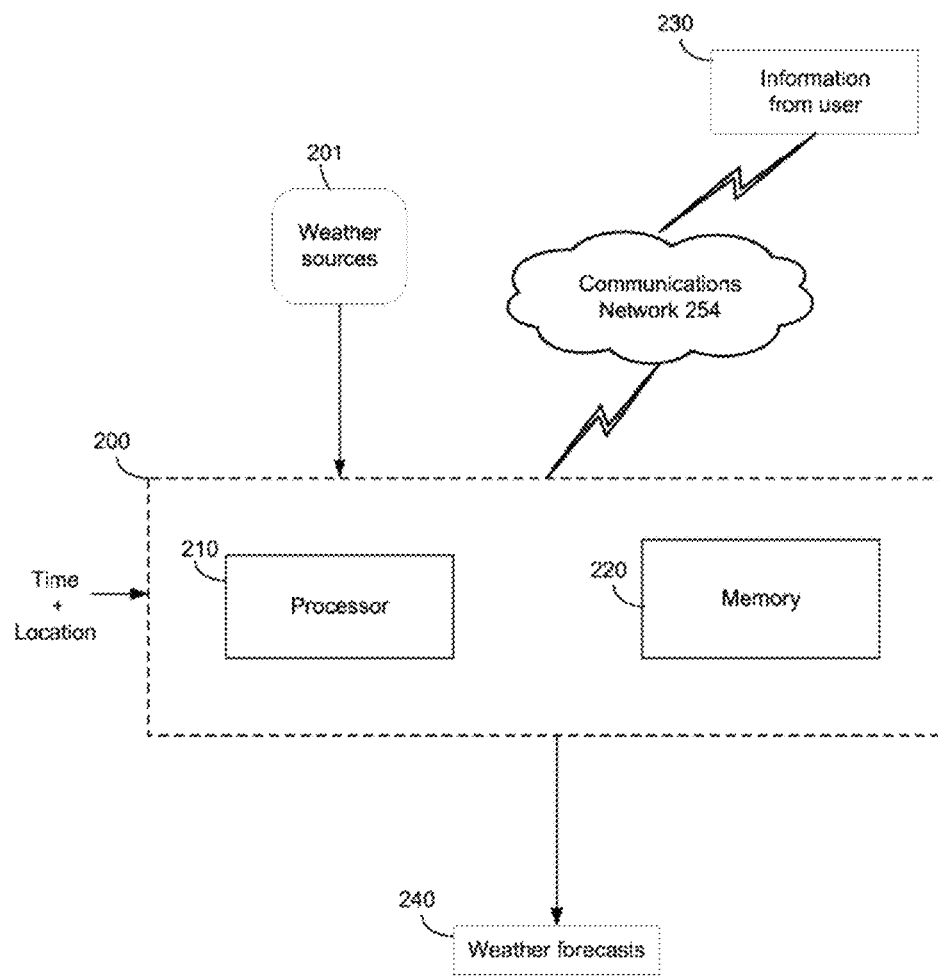
FIG. 2A shows an example of a block diagram of a suitable nowcaster for implementing one or more embodiments.
Figure 2B:
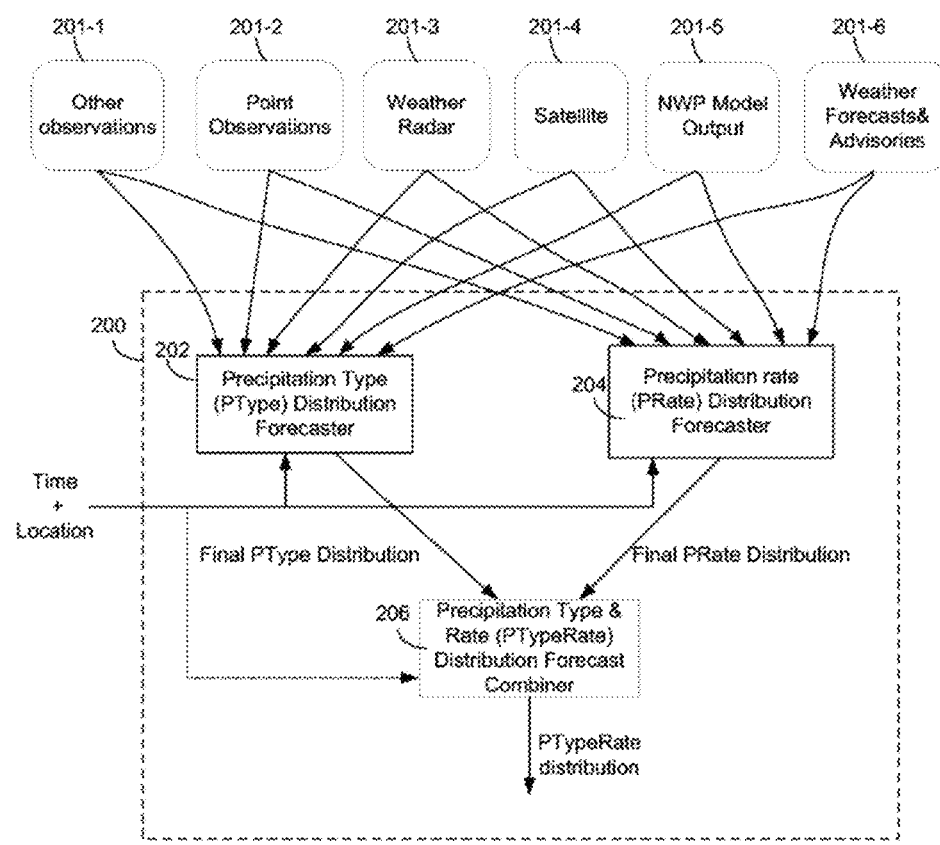
FIG. 2B is one example of a more detailed block diagram of a suitable nowcaster for implementing one or more embodiments.
Figure 2C:
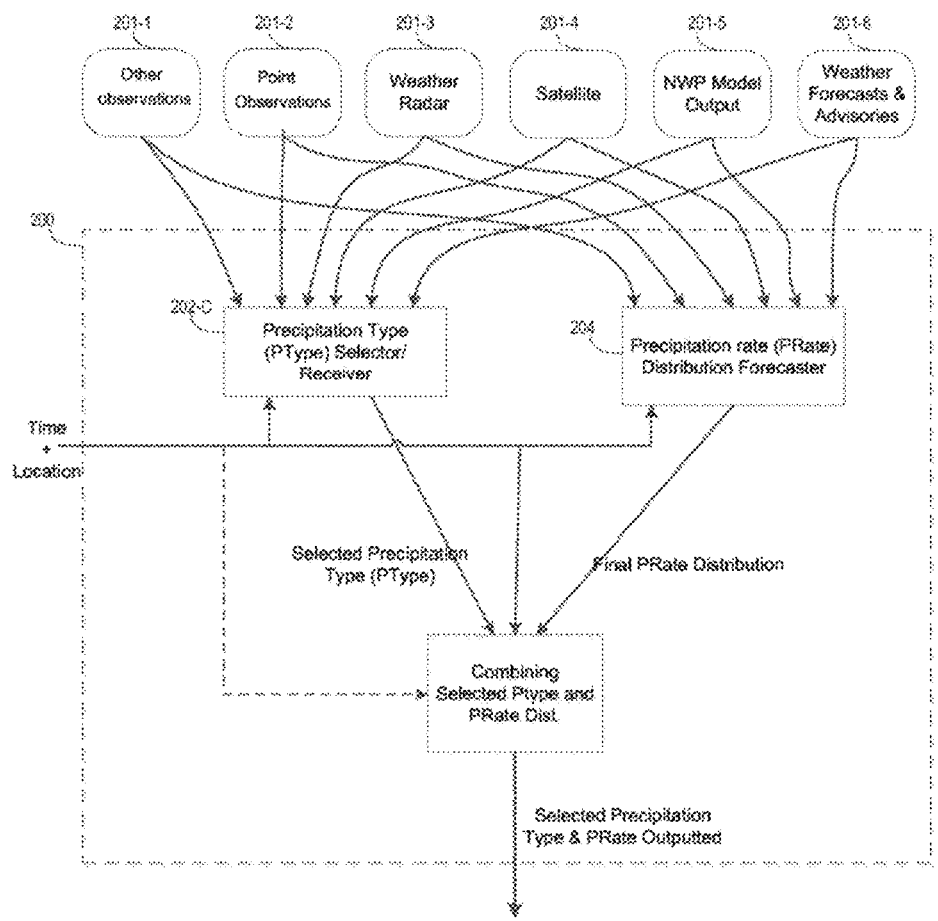
FIG. 2C is another example of a more detailed block diagram of a suitable nowcaster for implementing one or more embodiments.

FIGS. 2A-2C are block diagrams of a nowcaster according to one or more embodiments of the subject matter described in the specification.

As shown in FIGS. 2A-2C, the nowcaster 200 receives weather observations from different sources 201 such as weather observation sources including but not limited to: point observations 201-2 (e.g., feedback provided by users and automated stations), weather radars 201-3, satellites 201-4 and other types of weather observations 201-1, and weather forecast sources such as numerical weather prediction (NWP) model output 201-5 and weather forecasts and advisories 201-6.

The nowcaster 200 comprises a memory 220 and a processor 210. The memory 220 comprises the instructions for the method and also stores data from the weather sources, intermediate results, and weather forecasts. The processor 210 allows the nowcaster 200 to perform calculations.

The nowcaster 200 can receive information 230 from a user through a communication network 254.

The nowcaster 200 outputs a weather forecast, or a succession of weather forecasts.

FIG. 2B is one embodiment of the nowcaster 200. In this embodiment, the nowcaster 200 comprises a PType distribution forecaster 202 and a PRate distribution forecaster 204. The PType distribution forecaster 202 receives the weather observations from the different sources 201 and outputs a probability distribution of precipitation type over an interval of time, for a given latitude and longitude (and/or location). For example:
 a. Snow: 10%
 b. Rain: 30%
 c. Freezing Rain: 60%
 d. Hail: 0%
 e. Ice Pellets: 0%

Similarly, the PRate distribution forecaster 204 receives the weather observations for a given latitude and longitude from the different sources 201 and outputs a probability distribution forecast of a precipitation rate (PRate) in a representation that expresses the uncertainty. For example, the PRate may be output as a probability distribution of precipitation rates or a range of rates over an interval of time, for a given latitude and longitude. For example:
 f. No Precip.: 30%
 g. Light: 40%
 h. Moderate: 20%
 i. Heavy: 10%

The PRate and PType values output by the PRate distribution forecaster 204 and the PType distribution forecaster 202 are sent to a forecast combiner 206 to combine these values into a single value PTypeRate which represents the precipitation outcomes. For example, if the value of PType is "Snow," and the value of "PRate" is heavy, the combined value of PTypeRate may be "heavy snow."

For a given latitude and longitude, the system outputs forecasted PTypeRate Distributions for predefined time intervals, either fixed (ex: 1 minute) or variable (ex: 1 minute, then 5 minutes, then 10 minutes, etc.). The system can either pre-calculate and store forecasted PTypeRate Distributions in a sequence of time intervals, or calculate it in real time. A PTypeRate Distribution represents, for each time interval, the certainty or uncertainty that a PTypeRate will occur.

With reference to FIG. 2B, the forecast combiner 206 receives the final PRate distribution from the PType distribution forecaster 202 and the final PRate distribution from the PRate distribution forecaster 204 to combine them into a group of PTypeRate distribution values each representing the probability of receiving a certain type of precipitation at a certain rate. An example is provided below.

Assuming that the PType distribution is as follows: Snow: 50%, Rain: 0%, Freezing rain: 30%, Hail: 0%, Ice pellets: 20%, and the PRate distribution is as follows: None: 0%, Light: 10%, Moderate: 20%, Heavy: 30%, Very Heavy: 40%, the PTypeRate distributions may be as follows:

TABLE 1

An Example of PTypeRate Distribution Table

| | | PType | | | |
|---|---|---|---|---|---|
| PRate | Snow 50% | Rain 0% | Freez. Rain 30% | Hail 0% | Ice Pellets 20% |
| None 0% | No precipitation | No precipitation | No precipitation | No precipitation | No precipitation |
| Light | 5% light | No | 3% light | No | 2% light ice |

TABLE 1-continued

An Example of PTypeRate Distribution Table

| | PType | | | | |
|---|---|---|---|---|---|
| PRate | Snow 50% | Rain 0% | Freez. Rain 30% | Hail 0% | Ice Pellets 20% |
| 10% | snow | precipitation | freezing rain | precipitation | pellets |
| Moderate 20% | 10% moderate snow | No precipitation | 6% moderate freezing rain | No precipitation | 4% moderate ice pellets |
| Heavy 30% | 15% heavy snow | No precipitation | 9% heavy freezing rain | No precipitation | 6% heavy ice pellets |
| Very Heavy 40% | 20% heavy snow | No precipitation | 12% very heavy freezing rain | No precipitation | 8% very heavy ice pellets |

Accordingly, the forecast combiner 206 multiplies the probability of each type of precipitation by the probability of each rate of precipitation to obtain a probability of receiving a certain type of precipitation at a certain rate, for example, 20% chance of heavy snow, or 12% chance of very heavy freezing rain. In an embodiment, it is possible to associate probability ranges with textual information for displaying the textual information to the user instead of the probabilities in numbers. For example, probabilities that are between 5% and 15% may be associated with the text: "low chance," while probabilities that are between 40% and 70% may be associated with the text "high chance," or "very likely," etc., whereby, instead of displaying: 60% chance of heavy snow, it is possible to display: "high chance of heavy snow."

In another embodiment, it is possible to combine two or more different PTypeRates along one or more dimensions (the dimensions including: the rate, type, or probability). For example, results of such combination may include: Likely light to moderate rain, Likely light to moderate rain or heavy snow; Likely moderate rain or snow; Likely rain or snow; Chance of light to moderate rain or heavy snow or light hail; Chance of moderate rain, snow or hail; Chance of rain, snow or hail, etc.

Accordingly, the nowcaster 200 receives the location for which the nowcasts are needed and the time and/or time interval for which the nowcasts are needed and outputs the PTypeRate distribution for the given location and for the specific time.

FIG. 2C illustrates another embodiment of the nowcaster 200. In this embodiment, the nowcaster 200 comprises a PType selector/receiver 202-C and a PRate distribution forecaster 204.

Similar to the embodiment shown in FIG. 2B, the PRate distribution forecaster 204 receives the weather observations for a given latitude and longitude from the different sources 201 and outputs a probability distribution forecast of a precipitation rate (PRate) in a representation that expresses the uncertainty. For example, the PRate may be output as a probability distribution of precipitation rates or a range of rates over an interval of time, for a given latitude and longitude. For example:
   f. No Precip.: 30%
   g. Light: 40%
   h. Moderate: 20%
   i. Heavy: 10%

However, the PType selector/receiver 202-C does not output a probability distribution associated with different types of precipitation. Instead, the PType selector/receiver 202-C receives weather observations for a given latitude and longitude from the different sources 201 to select one precipitation type from a list of different precipitation types. For example, based on the inputs received from the sources 201, the PType selector/receiver 202-C selects a single precipitation type that is most likely to occur in the given latitude and the longitude (and/or location) from the following list of precipitation types:
   a. Snow
   b. Rain
   c. Freezing Rain
   d. Hail
   e. Ice Pellets
   f. Mix (e.g., a+c, a+d, b+c, a+e, c+e, d+e, etc.)

From the list of precipitation types such as the one above, only one precipitation type is selected for a given location. For example, a mix of snow and freezing rain can be selected as the most likely precipitation type for a give location at a given time. The precipitation type is not associated with a probability value. In fact, since only one precipitation type is selected for any given location and time corresponding to the location, the selected precipitation type will have an effective probability value of 100%.

The list of precipitation types that are available for selection of one type may include a mix type that represent a mix of two different precipitation types (e.g., snow and freezing rain, hail and ice pellets, etc). A mix type is considered as a distinct precipitation type available for selection, and as shown above in (f) of the list, there can be many different mix types representing the mix of different pairs of various precipitation types.

In another embodiment, the precipitation type is not selected by the PType selector/receiver 202-C but instead is received from a source outside the nowcaster 200. In other words, the nowcaster 200 may request to a remote source (e.g., a third-party weather service) identification of the precipitation type that is most likely to occur for a given location at a given time and receive a response from the source identifying the most likely precipitation type. In this case, selection of the precipitation type is not performed by the nowcaster 200. The nowcaster 200 merely is inputted with the already-selected precipitation type and thereby can save computational power of the nowcaster 200 that would otherwise have been needed to perform the selection.

The selected precipitation type and the PRate values respectively output by the PType selector/receiver 202-C and the PRate distribution forecaster 204 are combined. For example, if the selected precipitation type is snow, and the PRate values are as described above, the combined information would indicate:
   a. No Snow: 30%
   b. Light Snow: 40% c. Moderate Snow: 20% d. Heavy Snow: 10%.

As only one precipitation type is concerned, only a minimal amount of computational power is needed to perform the combining to output the final weather forecast data. Since the PType selector/receiver 202-C will output one (1) precipitation type for a given location and time, if the PRate distribution forecaster 204 outputs a number m of probability distribution, the final weather forecast data will comprise only a number m (m*1) of weather forecast distribution.

In outputting the final weather forecast data, it is possible to associate probability ranges with textual information for displaying the textual information to the user instead of the probabilities in numbers, similar to the embodiment shown in FIG. 2B. For example, probabilities that are between 5% and 15% may be associated with the text: "low chance," while probabilities that are between 40% and 70% may be associated with the text "high chance," or "very likely," etc., whereby, instead of displaying: "60% chance of heavy snow," it is possible to display: "high chance of heavy snow."

Accordingly, the nowcaster 200 receives the location for which the nowcasts are needed and the time and/or time interval for which the nowcasts are needed and outputs the selected PType and PRate distribution for the given location and for the specific time.

The nowcaster according to the embodiment shown in FIG. 2C may be advantageous over the embodiment shown in FIG. 2B in certain circumstances in which efficiency is desired. The embodiment of FIG. 2C can be implemented using much less processing power than the embodiment of FIG. 2B. However, the embodiment of FIG. 2B may be more suitable than the embodiment of FIG. 2C in providing a more detailed and accurate snapshot of weather forecast data for any given location and time.

Figure 4A:
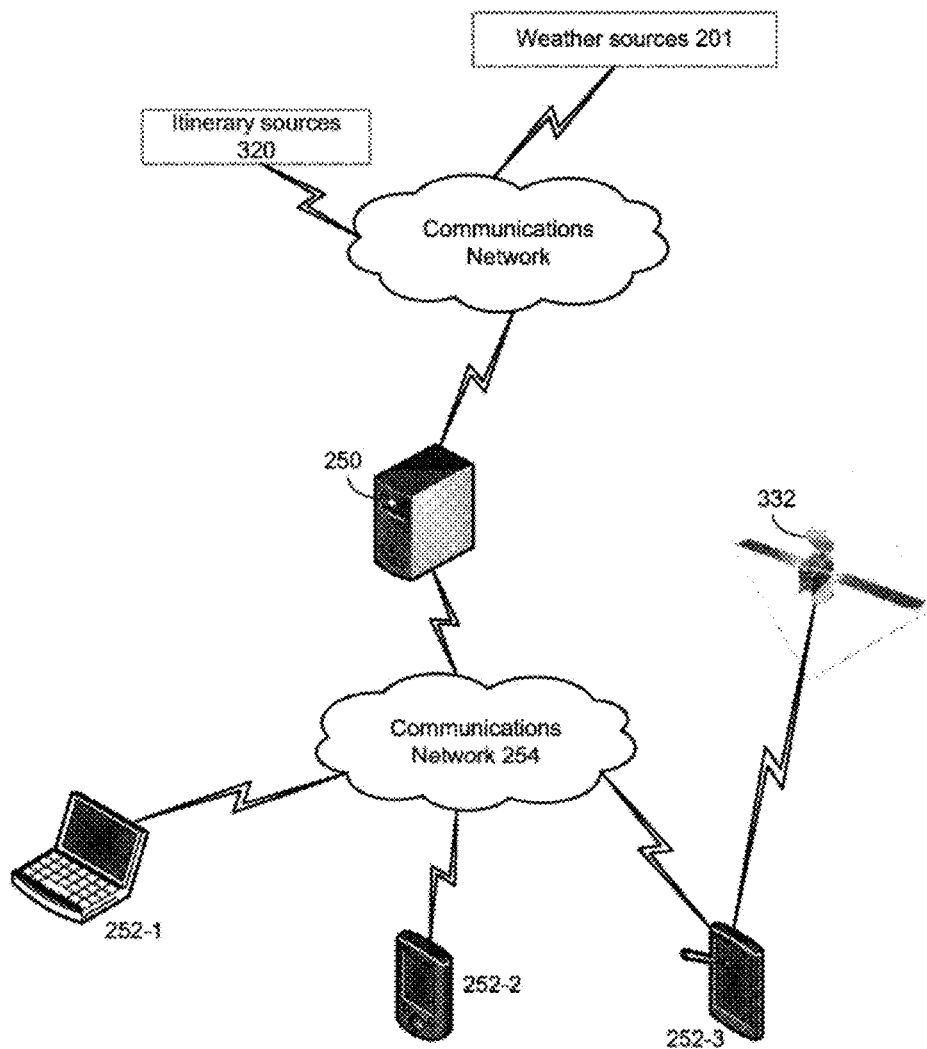
FIG. 4A is an example of a network environment in which the embodiments may be practiced.

FIG. 4A is an example of a network environment in which the embodiments may be practiced. The nowcaster 300 may be implemented on a server/computer 250 which is accessible by a plurality of client computers 252 over a communication network 254. The client computers may include but are not limited to: laptops, desktops, portable computing devices, tablets, and the like. Using a client computer 252, each user may enter the directions between two locations and preferably the time of departure (otherwise the current time is used to replace this). The information is sent to the remote server 250 over a telecommunications network. The server 250 returns a list of locations on the route from locations A to B along with nowcasts at these locations on the route. The server accesses weather source 201 over a telecommunications network as discussed in connection with FIG. 2A. The server 250 may have geographic data stored thereon and may also access itinerary sources 320 provided by a third entity.

Preferably, the client computer 252 is GPS-enabled, in which case, the client computer 252 may provide updates to the server 250 for updating the nowcasts along the route, as discussed above.

Figure 4B:
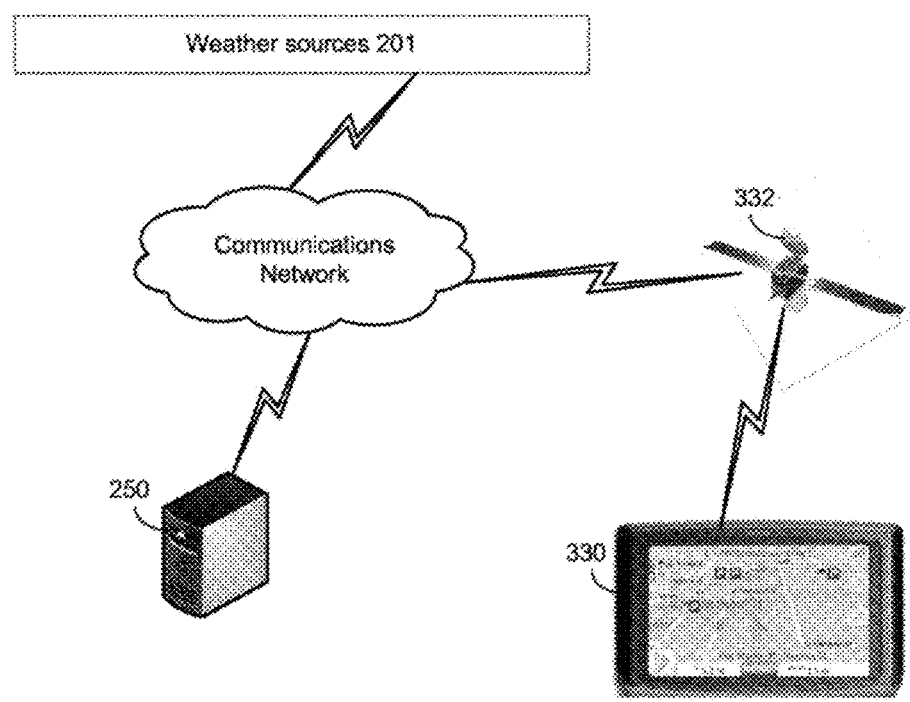
FIG. 4B is an example of another network environment in which the embodiments may be practiced.

FIG. 4B is an example of another network environment in which the embodiments may be practiced. In this embodiment, the user enters the destination and views the itinerary on a GPS navigation device. The GPS navigation device takes the departure location as the present location. The present location and the end destination along with the route chosen by the satellite may be sent to the server 250 via the satellite 332. The intelligence module implemented in the server 250 may return the nowcasts for key points along the route, and send the nowcasts and an identification of the key points to the GPS device 330 for adding to the itinerary given by the GPS device 330.

In an embodiment, if the user is generating an itinerary using a GPS and/or web-enabled computing device, the nowcasts may be updated on the map based on the advancement of the user on the route and the changes in weather conditions.

In an embodiment, the nowcasts may be provided on the map along with the time/time interval associated with each nowcast. In an embodiment, the time shown on the map is the estimated time of arrival which is estimated by the intelligence module 312 based on the current location, speed, and weather and traffic conditions.

Hardware and Operating Environment

Figure 5:
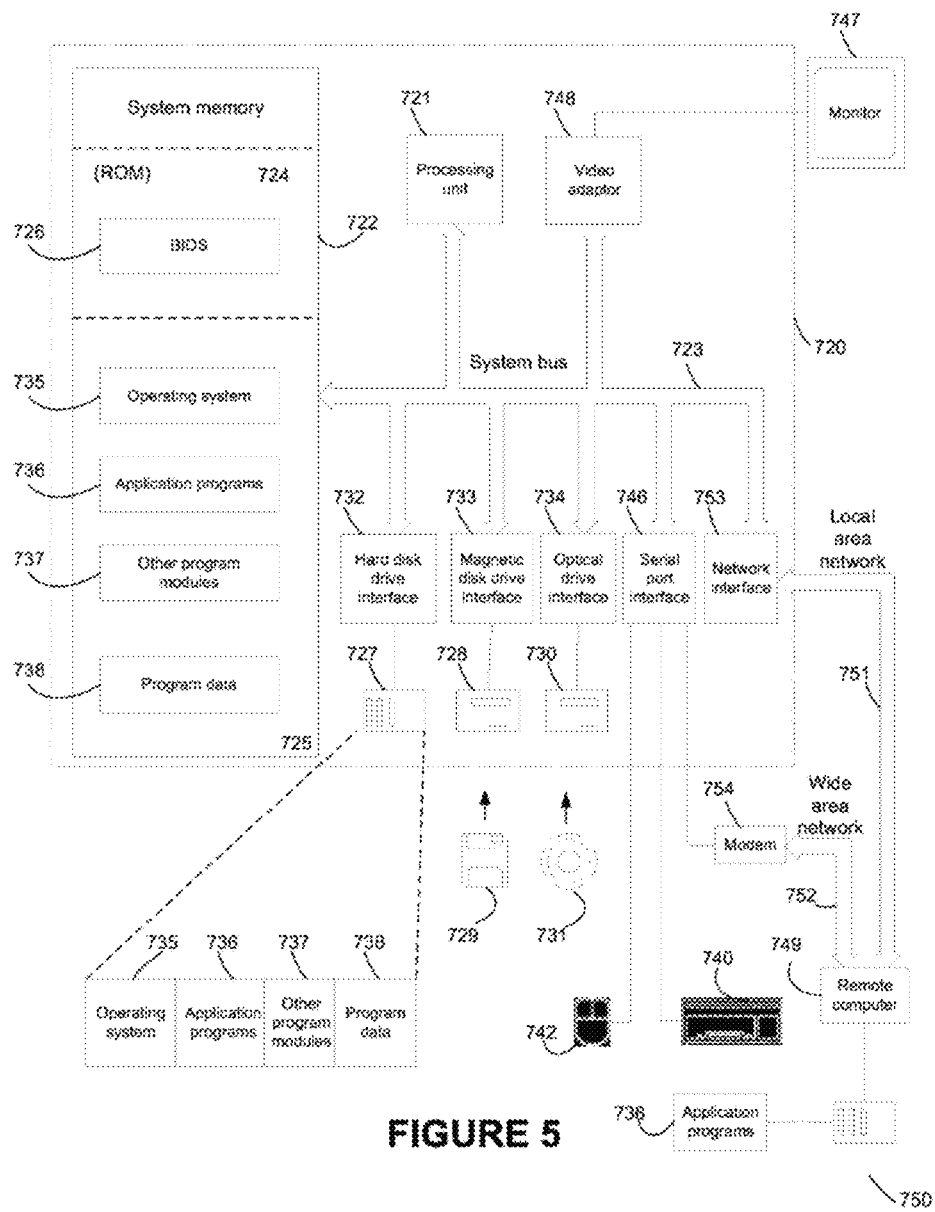
FIG. 5 is an exemplary diagram illustrating a suitable computing operating environment in which embodiments of the claimed subject matter may be practiced.

FIG. 5 illustrates an exemplary diagram of a suitable computing operating environment in which embodiments of the claimed subject matter may be practiced. The following description is associated with FIG. 5 and is intended to provide a brief, general description of suitable computer hardware and a suitable computing environment in conjunction with which the embodiments may be implemented. Not all the components are required to practice the embodiments, and variations in the arrangement and type of the components may be made without departing from the spirit or scope of the embodiments.

Although not required, the embodiments are described in the general context of computer-executable instructions, such as program modules, being executed by a computer, such as a personal computer, a hand-held or palm-size computer, smartphone, or an embedded system such as a computer in a consumer device or specialized industrial controller. Generally, program modules include routines, programs, objects, components, data structures, etc., that perform particular tasks or implement particular abstract data types.

Moreover, those skilled in the art will appreciate that the embodiments may be practiced with other computer system configurations, including hand-held devices, multiprocessor systems, microprocessor-based or programmable consumer electronics, network PCS, minicomputers, mainframe computers, cellular telephones, smartphones, display pagers, radio frequency (RF) devices, infrared (IR) devices, Personal Digital Assistants (PDAs), laptop computers, wearable computers, tablet computers, a device of the iPod or iPad family of devices, integrated devices combining one or more of the preceding devices, or any other computing device capable of performing the methods and systems described herein. The embodiments may also be practiced in distributed computing environments where tasks are performed by remote processing devices that are linked through a communications network. In a distributed computing environment, program modules may be located in both local and remote memory storage devices.

The exemplary hardware and operating environment of FIG. 5 includes a general-purpose computing device in the form of a computer 720, including a processing unit 721, a system memory 722, and a system bus 723 that operatively couples various system components including the system memory to the processing unit 721. There may be only one or there may be more than one processing unit 721, such that the processor of computer 720 comprises a single central-processing unit (CPU), or a plurality of processing units, commonly referred to as a parallel processing environment. The computer 720 may be a conventional computer, a distributed computer, or any other type of computer; the embodiments are not so limited.

The system bus 723 may be any of several types of bus structures including a memory bus or memory controller, a peripheral bus, and a local bus using any of a variety of bus architectures. The system memory may also be referred to as simply the "memory," and includes read-only memory (ROM) 724 and random access memory (RAM) 725. A basic input/output system (BIOS) 726, containing the basic routines that help to transfer information between elements within the computer 720, such as during start-up, is stored in ROM 724. In one embodiment of the claimed subject matter, the computer 720 further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731, such as a CD ROM or other optical media. In alternative embodiments of the claimed subject matter, the functionality provided by the hard disk drive 727, magnetic disk 729 and optical disk drive 730 is emulated using volatile or non-volatile RAM in order to conserve power and reduce the size of the system. In these alternative embodiments, the RAM may be fixed in the computer system, or it may be a removable RAM device, such as a Compact Flash memory card.

In an embodiment of the claimed subject matter, the hard disk drive 727, magnetic disk drive 728, and optical disk drive 730 are connected to the system bus 723 by a hard disk drive interface 732, a magnetic disk drive interface 733, and an optical disk drive interface 734, respectively. The drives and their associated computer-readable media provide non-volatile storage of computer readable instructions, data structures, program modules, and other data for the computer 720. It should be appreciated by those skilled in the art that any type of computer-readable media that can store data that is accessible by a computer, such as magnetic cassettes, flash memory cards, digital video disks, Bernoulli cartridges, RAMs, ROMs, and the like, may be used in the exemplary operating environment.

A number of program modules may be stored on the hard disk, magnetic disk 729, optical disk 731, ROM 724, or RAM 725, including an operating system 735, one or more application programs 736, other program modules 737, and program data 738. A user may enter commands and information into the personal computer 720 through input devices such as a keyboard 740 and pointing device 742. Other input devices (not shown) may include a microphone, joystick, game pad, satellite dish, scanner, touch-sensitive pad, or the like. These and other input devices are often connected to the processing unit 721 through a serial port interface 746 that is coupled to the system bus, but may be connected by other interfaces, such as a parallel port, game port, or a universal serial bus (USB). In addition, input to the system may be provided by a microphone to receive audio input.

A monitor 747 or other type of display device is also connected to the system bus 723 via an interface, such as a video adapter 748. In one embodiment of the claimed subject matter, the monitor comprises a Liquid Crystal Display (LCD). In addition to the monitor, computers typically include other peripheral output devices (not shown), such as speakers and printers. The monitor may include a touch-sensitive surface which allows the user to interface with the computer by pressing on or touching the surface.

The computer 720 may operate in a networked environment using logical connections to one or more remote computers, such as a remote computer 749. These logical connections are achieved by a communication device coupled to or a part of the computer 720; the embodiment is not limited to a particular type of communications device. The remote computer 749 may be another computer, a server, a router, a network PC, a client, a peer device, or other common network node, and typically includes many or all of the elements described above relative to the computer 720, although only a memory storage device 750 has been illustrated in FIG. 6. The logical connections depicted in FIG. 6 include a local-area network (LAN) 751 and a wide-area network (WAN) 752. Such networking environments are commonplace in offices, enterprise-wide computer networks, intranets, and the Internet.

When used in a LAN-networking environment, the computer 720 is connected to the local network 751 through a network interface or adapter 753, which is one type of communications device. When used in a WAN-networking environment, the computer 720 typically includes a modem 754, a type of communications device, or any other type of communications device for establishing communications over the WAN 752, such as the Internet. The modem 754, which may be internal or external, is connected to the system bus 723 via the serial port interface 746. In a networked environment, program modules depicted relative to the personal computer 720, or portions thereof, may be stored in the remote memory storage device. It is appreciated that the network connections shown are exemplary and other means of establishing a communications link between the computers may be used.

The hardware and operating environment in conjunction with which embodiments of the claimed subject matter may be practiced has been described. The computer in conjunction with which embodiments of the claimed subject matter may be practiced may be a conventional computer, a hand-held or palm-size computer, a computer in an embedded system, a distributed computer, or any other type of computer; the claimed subject matter is not so limited. Such a computer typically includes one or more processing units as its processor, and a computer-readable medium such as a memory. The computer may also include a communications device, such as a network adapter or a modem, so that it is able to communicatively couple other computers.

While preferred embodiments have been described above and illustrated in the accompanying drawings, it will be evident to those skilled in the art that modifications may be made without departing from this disclosure. Such modifications are considered as possible variants comprised in the scope of the disclosure.

What is claimed is:

1. A computer implemented method for generating itineraries comprising:
   identifying a departure location and a destination location;
   identifying a first probability of a particular type of precipitation occurring at a particular rate at a first intermediary location between the departure location and the destination location;
   identifying a second probability of the particular type of precipitation occurring at the particular rate at a second intermediary location between the departure location and the destination location; and
   generating an itinerary that includes the first intermediary location or the second intermediary location based on a comparison of the first probability and the second probability.

2. The method of claim 1, further comprising estimating an arrival time at the first intermediary location, wherein the first probability is associated with the particular type of precipitation occurring at the particular rate at the first intermediary location at the estimated arrival time.

3. The method of claim 2, further comprising:
identifying a modified arrival time associated with the first intermediary location based on the first probability;
identifying a modified probability of the particular type of precipitation occurring at the particular rate at the first intermediary location at the modified arrival time; and
generating the itinerary based further on the modified probability.

4. The method of claim 1, further comprising:
identifying a first distribution of probabilities indicating likelihoods of each of a plurality of precipitation types occurring at the first intermediary location;
identifying a second distribution of probabilities indicating likelihoods of each of a plurality of precipitation rates occurring at the first intermediary location; and
determining, based on the first distribution and the second distribution, a third distribution of probabilities indicating likelihoods of each of the plurality of precipitation types occurring at each of the plurality of precipitation rates at the first intermediary location, the third distribution including the first probability.

5. The method of claim 4, wherein determining the third distribution includes multiplying the first distribution by the second distribution.

6. The method of claim 4, wherein the plurality of precipitation types includes a snow type, a rain type, a freezing rain type, a hail type, and an ice pellet type.

7. The method claim 4, wherein the plurality of precipitation rates includes a zero rate, a light rate, a moderate rate, a heavy rate, and a very heavy rate.

8. The method of claim 1, wherein the particular type of precipitation corresponds to snow.

9. The method of claim 1, wherein:
the departure location and the destination location are received from a remote device; and
at least one of the departure location and the destination location is associated with a current location of the remote device.

10. The method of claim 1, further comprising selecting the particular type of precipitation based on weather reports associated with the first intermediary location.

11. A device for generating itineraries comprising:
one or more processors; and
a memory storing instructions executable by the one or more processors to perform operations comprising:
identifying a departure location and a destination location;
identifying a first probability of a particular type of precipitation occurring at a particular rate at a first intermediary location between the departure location and the destination location;
identifying a second probability of the particular type of precipitation occurring at the particular rate at a second intermediary location between the departure location and the destination location; and
generating an itinerary including the first intermediary location or the second intermediary location based on a comparison of the first probability and the second probability.

12. The device of claim 11, wherein the operations further include estimating an arrival time at the first intermediary location, wherein the first probability is associated with the particular type of precipitation occurring at the particular rate at the first intermediary location at the estimated arrival time.

13. The device of claim 12, wherein the operations further include:
identifying a modified arrival time associated with the first intermediary location based on the first probability;
identifying a modified probability of the particular type of precipitation occurring at the particular rate at the first intermediary location at the modified arrival time; and
generating the itinerary based further on the modified probability.

14. The device of claim 11, wherein the operations further include:
identifying a first distribution of probabilities indicating likelihoods of each of a plurality of precipitation types occurring at the first intermediary location;
identifying a second distribution of probabilities indicating likelihoods of each of a plurality of precipitation rates occurring at the first intermediary location; and
determining, based on the first distribution and the second distribution, a third distribution of probabilities indicating likelihoods of each of the plurality of precipitation types occurring at each of the plurality of precipitation rates at the first intermediary location, the third distribution including the first probability.

15. The device of claim 14, wherein determining the third distribution includes multiplying the first distribution by the second distribution.

16. The device of claim 14, wherein the plurality of precipitation types includes a snow type, a rain type, a freezing rain type, a hail type, and an ice pellet type.

17. The device of claim 14, wherein the plurality of precipitation rates includes a zero rate, a light rate, a moderate rate, a heavy rate, and a very heavy rate.

18. The device of claim 11, further comprising a communication module configured to receive the departure location and the destination location from a remote device, wherein the departure location is associated with a current location of the remote device.

19. A system comprising:
a server comprising a computer and a non-transitory computer-readable medium storing instructions comprising a program executable by the computer to perform an itinerary generation process, the itinerary generation process including:
identifying a departure location and a destination location;
identifying a first probability of a particular type of precipitation occurring at a particular rate at a first intermediary location between the departure location and the destination location;
identifying a second probability of the particular type of precipitation occurring at the particular rate at a second intermediary location between the departure location and the destination location; and
generating an itinerary including the first intermediary location or the second intermediary location based on a comparison of the first probability and the second probability; and
a remote device comprising one or more processors, a display device, and a memory storing instructions executable by the one or more processors to:
receive the itinerary from the server; and
initiate presentation of at least part of the itinerary via the display device.

20. The system of claim 19, wherein the itinerary generation process further includes:
identifying a first distribution of probabilities indicating likelihoods of each of a plurality of precipitation types occurring at the first intermediary location;

identifying a second distribution of probabilities indicating likelihoods of each of a plurality of precipitation rates occurring at the first intermediary location; and determining, based on the first distribution and the second distribution, a third distribution of probabilities indicating likelihoods of each of the plurality of precipitation types occurring at each of the plurality of precipitation rates at the first intermediary location, the third distribution including the first probability.

* * * * *